United States Patent [19]

Berns et al.

[11] 4,178,874
[45] Dec. 18, 1979

[54] ROADSIDE EMERGENCY SIGNALLING DEVICE

[76] Inventors: Michael S. Berns; William J. Chafe, both of c/o Messrs. Mann & Macera, Suite 1, 201 McLeod St., Ottawa, Ontario, Canada, K2P 0Z9

[21] Appl. No.: 915,154

[22] Filed: Jun. 13, 1978

[51] Int. Cl.² ............................................. G09F 21/04
[52] U.S. Cl. .................................... 116/28 R; 40/591
[58] Field of Search ............ 116/63 P, 28 R; 40/591, 40/592, 606, 610, 584, 489

[56] References Cited

U.S. PATENT DOCUMENTS

| | | | |
|---|---|---|---|
| 2,010,404 | 8/1935 | Lush | 40/606 |
| 2,090,157 | 8/1937 | Smith | 40/610 |
| 2,208,213 | 7/1940 | Ericson | 40/606 X |
| 2,515,313 | 7/1950 | Pember, Sr. | 40/606 |
| 2,881,662 | 4/1959 | Harris | 116/63 P X |
| 3,113,552 | 12/1963 | Spooncer | 116/63 P |
| 3,672,323 | 6/1972 | Hawes | 116/28 R |
| 3,703,152 | 11/1972 | Morton | 116/28 R |
| 3,936,967 | 2/1976 | Davis | 40/592 |
| 3,975,849 | 8/1976 | Tuleja | 40/583 |
| 4,062,139 | 12/1977 | Klösel | 40/591 X |

FOREIGN PATENT DOCUMENTS 678237 1/1964 Canada ...................................... 40/592

*Primary Examiner*—Daniel M. Yasich
*Attorney, Agent, or Firm*—Murray and Whisenhunt

[57] ABSTRACT

A plastic information and signalling device having a cross-sectional triangular configuration which is adapted to hang over a partially opened vehicle window to communicate to observers the desired information or signal. The device has pockets into which information and signalling signs may be inserted to visibly display the message on these signs. The device is collapsable into a rectangular shape for convenient storage.

5 Claims, 4 Drawing Figures

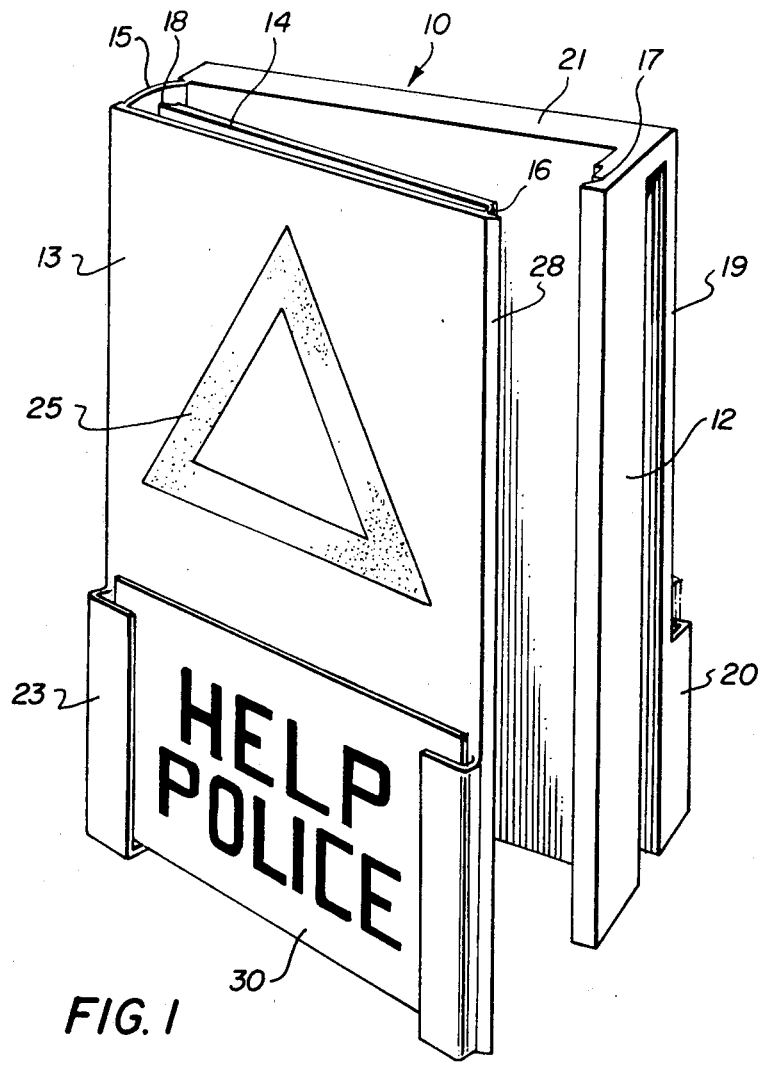
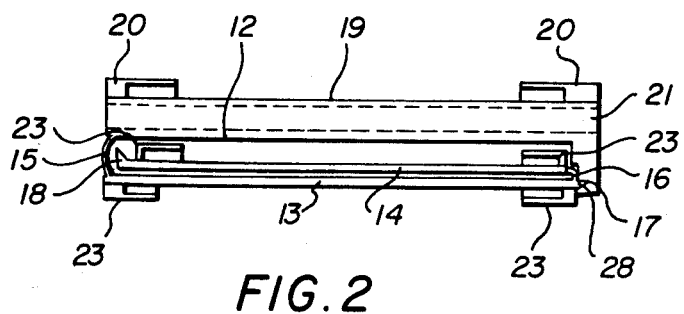
FIG. 1
FIG. 2

ROADSIDE EMERGENCY SIGNALLING DEVICE

The present invention relates to an information and signalling device which can be mounted on windows, preferably openable vehicle windows. The device has diverse interchangeable signs which would indicate the message to be communicated to the observer. The device is collapsable so that it can be stored conveniently, and is easily constructed and mounted on the vehicle window. A particular application of the device would be to indicate an emergency situation to the occupant of an automobile.

As is well known, there are many conventional emergency signals which are used by vehicles when needed. One such readily available signal is the four-way emergency flasher system installed in automobiles which are easily activated from within the vehicle. One of the drawbacks with the four-way flashing device is that someone seeing this signal is often unsure of the type of emergency that exists, if any emergency exists at all. Other less frequently used emergency signals generally require the occupant of the vehicle to reduce the security of the vehicle by lowering one window completely, opening the door, or leaving the vehicle altogether. An example of such warning devices is the setting up of flares on the road, tying a white cloth on the door handle, or raising the hood. These warning devices suffer from the same drawbacks as the four-way flashing system since the nature and the magnitude of the emergency is not readily apparent.

Thus, from the standpoint of both the occupant of the stopped vehicle and others who may witness the conventional emergency signal in use, the type, seriousness, and even the existence of a bona fide emergency are often in question despite the use of any or all of the foregoing conventional emergency signalling devices. This ambiguity in communicating the presence of a bona fide emergency where there may, for instance, be injuries or illness, could result in delays in the victim obtaining professional help, which could, in turn, aggravate the illness or injury, resulting perhaps in further medical problems to the occupant(s) of the vehicle.

Another disadvantage associated with the aforementioned conventional emergency signals is the fear of a passing motorist to stop and render assistance. It is known that rescuers have been attacked or robbed by the occupants of a stopped vehicle, and these concerns and others may prevent passing motorists from slowing down to inspect the stopped vehicle and the condition of its occupants or stopping and rendering assistance. A further disadvantage with conventional emergency signals is that a passing motorist who sees such a conventional signal may be reticent about reporting it to the authorities since he is unsure as to what the emergency is, if an emergency exists at all. Obviously, because conventional vehicular emergency signals are ambiguous in the message they communicate and because use of these same signals may involve additional risks to the stopped vehicle's occupant, or risks to a passing motorist who decides to stop and inquire about the nature of the emergency and render assistance, there is certainly a diminished effectiveness of the conventional emergency signal to communicate to others not only the existence of a bona fide emergency but also to clearly articulate to the stopped vehicle's occupant and others how the emergency should be correctly dealt with (i.e. what professional aid should be sought and what can be done until professional help arrives).

Accordingly, it is an object of the present invention to provide an improved information and signalling device for use on openable vehicle windows.

It is another object of the present invention to provide a triangular display apparatus which is collapsable and quickly and easily folds open and locks into a triangular-shaped structure and which can easily be mounted onto an openable vehicle window without requiring tools or mounting equipment. In the collapsed mode, the device folds into a flat compact form for storage in an easily retrievable area of the vehicle, such as in the glove compartment or attached to a sun visor or under the driver's seat.

It is a further object of the present invention to provide an effective signalling device that is relatively simple to use, reliable, economical, and capable of being reused many times, as compared with road flares and other devices.

It is another object of the present invention to provide an information and signalling device, the said device containing pertinent emergency information, such as mechanical information, first aid information, and other information for assistance in emergencies.

It is another object of the present invention to provide an emergency signalling device in a highly visible and readily understandable format which can simply and quickly communicate to others the nature of the emergency and the type of professional assistance required.

It is another object of the present invention to provide the occupant of a stopped vehicle with writing material and/or an emergency check list outlining the most common vehicular emergencies encountered so that the vehicle's occupants can provide the proper authorities with, for instance, medical information, or deal with the problem(s) themselves.

In accordance with the present invention, there is provided an information and signalling device for use on openable vehicle windows, said device having a collapsed mode and a constructed mode. The said device comprises a first semi-rigid or rigid rectangular panel having a top flange extending rearwardly a distance greater than the vehicle window thickness, a second semi-rigid or rigid rectangular panel having its top affixed to the said top flange on the said first panel, and having a sign retaining means to hold information signs and signalling signs, a third semi-rigid or rigid rectangular panel having an information/signalling sign display means adaptable to visibly display information signs and signalling signs when the device is in the constructed mode, first flexible hinge means connecting one side of said third panel to one side of said first panel, a fourth semi-rigid or rigid rectangular panel having an information/signalling sign display means adaptable to visibly display information signs and signalling signs when the device is in the constructed mode, second flexible hinge means connecting one side of said fourth panel to the side of the third panel opposite the said first flexible hinge means, engaging means to lockingly engage the other side of said fourth panel to the other side of said first panel, and a plurality of information signs and signalling signs adapted to be removably connected to said information/signalling sign display means and to said sign retaining means, wherein said device, when in the constructed mode on a vehicle window, has a substantially triangular configuration visibly displaying a pre-determined signalling sign or information sign on said third and fourth panels.

The present invention could also be employed on any type of window which opens in a downward direction, or on any type of ledge which can accomodate it. In particular, the present invention could be employed on appropriate spots in floats and the like for use in parades and rallies, and on house or apartment or store windows for use in advertising.

A preferred embodiment of the said device will be described hereinafter with the aid of the accompanying drawings.

FIG. 1 illustrates a top view of the panels of a preferred embodiment of the present invention;

FIG. 2 illustrates a top view of the preferred embodiment of the present invention when in the collapsed mode;

Figure 3:
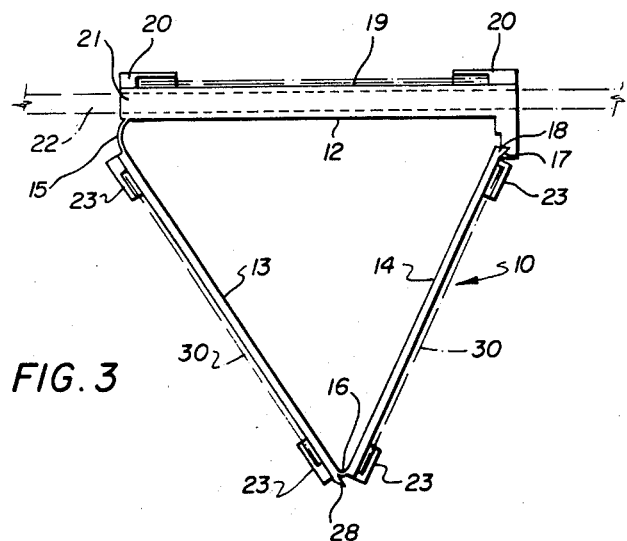
FIG. 3 illustrates a perspective view of a preferred embodiment of the present invention when in an opened mode.

Referring now to the drawings, the information and signalling device in accordance with the present invention is generally indicated by numeral 10. The device is preferably made of plastic so as to be long wearing and relatively weather proof. The device contains substantially rectangular panels 12, 13, 14 and 19. Top flange 21 extends from the top of rectangular panel 12 in a rearward direction across vehicle window 22 to the top portion of panel 19. Panel 19 extends in a plane parallel with that of panel 12 so as to engulf window 22 while resting upon it. Panel 19 contains a pocket 20 which may be used for retaining information signs and signalling signs.

Panel 12 is joined to panel 13 by flexible hinge 15 which will allow panel 12 and panel 13 to be in planar contact when device 10 is in the collapsed mode. Panel 13 contains outer pocket 23 into which information signs and signalling signs may be inserted so that they are visible when viewing from direction 100. Pocket 23 is preferably designed so as to retain only the bottom and side borders of an information or signalling sign which results in leaving the central portion of the sign clearly visible.

Panel 13 is connected to panel 14 through second flexible hinge 16, preferably made of plastic. Hinge 16 is designed so that when device 10 is in the collapsed mode, pocket 24 located on panel 14 is in planar contact with pocket 23 on panel 13. Pocket 24 is preferably identical to pocket 23, and both are also preferably made of plastic.

One end of panel 12 contains female mating groove 17 into which male member 18 on panel 14 may be lockingly inserted to hold device 10 in a rigid stable constructed mode.

Figure 4:
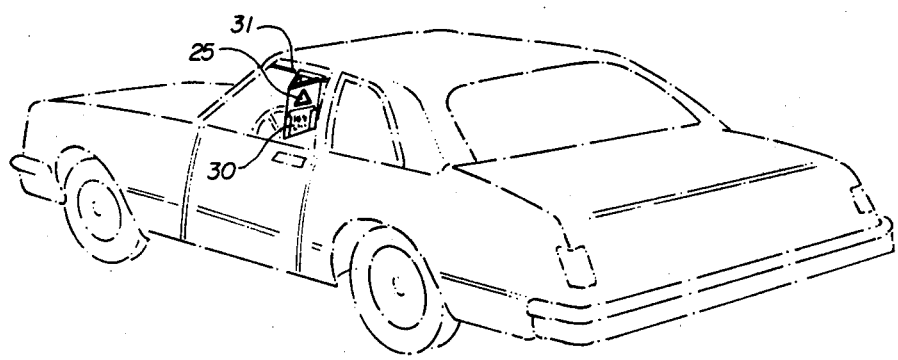
FIG. 4 illustrates a side view of the present invention when in the constructed mode and employed on a partially opened vehicle window.

FIG. 4 shows information and signalling device 10 employed on a partially opened vehicle window containing a typical information/signalling sign 30, which presumably will clearly indicate to an observer the nature of the emergency.

Typical information and signalling signs could be "HELP", "POLICE", "MEDICAL", "GAS", "MECHANICAL", "DOCTOR" or a blank sign onto which an appropriate message could be written, which would be clearly visible to observers by having the sign positioned in pockets 23 and 24.

As most clearly illustrated in FIG. 4, the placement of the information and signalling device 10 upon window 22 generally allows for a space 31 thus providing the vehicle occupant with access to fresh air and yet providing the vehicle occupant with security. Also, space 31 can be minimized to allow the vehicle occupant to depart and lock the vehicle, and yet allow observers to determine the nature of the problems or emergency associated with the vehicle. Preferably, a reflecting triangular portion 25 is included on panels 13 and 14 positioned above pockets 23 and 24 respectively.

The foregoing description is a description of a preferred embodiment of the invention, and it will be apparent that changes and modifications can be made to the preferred embodiment without departing from the spirit of the invention. The preferred embodiment of the invention is for the purposes of illustration only and is not to be construed as a limitation of the invention, the scope of which is defined in the appended claims.

We claim:

1. An information and signalling device for use on downwardly openable windows, said device having a collapsed mode and a constructed mode, comprising:
    (a) a first semi-rigid or rigid substantially rectangular panel having a top flange extending rearwardly over said window when suspended therefrom a distance greater than the window thickness;
    (b) a second semi-rigid or rigid substantially rectangular panel substantially the same size as said first panel having its top affixed to said top flange on said first panel, and having a sign retaining means to hold information signs and signalling signs, said first and second panels parallel to the window when suspended therefrom;
    (c) a third semi-rigid or rigid substantially rectangular panel having an information/signalling sign display means adaptable to visibly display information signs and signalling signs when the device is in the constructed mode;
    (d) first flexible hinge means connecting one side of said third panel to one side of said first panel;
    (e) fourth semi-rigid or rigid substantially rectangular panel having an information/signalling sign display means adaptable to visibly display information signs and signalling signs when the device is in the constructed mode on the window;
    (f) second flexible hinge means connecting one sign of said fourth panel to the side of the third panel opposite said first flexible hinge means;
    (g) engaging means to lockingly engage the other side of said fourth panel to the other side of said first panel;
    (h) a plurality of information signs and signalling signs adapted to be removably connected to said information/signalling sign display means and to said sign retaining means;
    wherein said device, when in the constructed mode and on a window, has a substantially triangular configuration visibly displaying a predetermined signalling sign or information sign on said third and fourth panels.

2. An information and signalling device as claimed in claim 1 wherein said downwardly openable window is on an automobile.

3. An information and signalling device as claimed in claim 2 wherein said first, second, third and fourth panels are made of plastic, and said first and second flexible hinge means are made of plastic.

4. An information and signalling device as claimed in claim 3 wherein said third and fourth panels contain a reflecting triangle positioned above said information or signalling signs.

5. In combination, an information and signalling device, and a downwardly openable motor vehicle window, said device having a collapsed mode and a constructed mode, comprising:
   (a) a first semi-rigid or rigid substantially rectangular panel having a top flange extending over the top of a motor vehicle window, the said first panel located in parallel planar relationship to and on one side of said window;
   (b) a second semi-rigid or rigid substantially rectangular panel of substantially the same size as said first panel having its top portion affixed to one end of said top flange and hanging parallel to the other side of said motor vehicle window, and having a sign retaining means to hold information signs and signalling signs;
   (c) a third semi-rigid or rigid substantially rectangular panel containing an information/signalling sign display means adaptable to visibly display information signs and signalling signs when the device is employed with said motor vehicle window;
   (d) first flexible hinge means connecting one side of said third panel to one side of said first panel;
   (e) a fourth semi-rigid or rigid substantially rectangular panel having an information/signalling sign display means adaptable to visibly display information signs and signalling signs when the device is employed with said motor vehicle window;
   (f) second flexible hinge means connecting one side of said fourth panel to the other side of said first panel;
   (g) engaging means to lockingly engage the other side of said fourth panel to the other side of said first panel;
   (h) a plurality of information signs and signalling signs adapted to be removably connected to said information/signalling sign display means and to said sign retaining means.

* * * * *